United States Patent
Warbrick et al.

(10) Patent No.: US 6,782,200 B1
(45) Date of Patent: Aug. 24, 2004

(54) PACKET-BASED OPTICAL COMMUNICATIONS NETWORKS

(75) Inventors: Kevin Warbrick, Bishops Stortford (GB); Peter D Roorda, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 587 days.

(21) Appl. No.: 09/693,100

(22) Filed: Oct. 20, 2000

(51) Int. Cl.[7] ............................................... H04J 14/66
(52) U.S. Cl. ...................................... 398/51; 398/166
(58) Field of Search ........................... 398/51, 54, 166, 398/50, 49

(56) References Cited

U.S. PATENT DOCUMENTS

| | | | |
|---|---|---|---|
| 5,840,622 A | 11/1998 | Miles et al. | ................. 438/622 |
| 6,003,089 A | * 12/1999 | Shaffer et al. | ............... 709/233 |
| 6,271,946 B1 | * 8/2001 | Chang et al. | .................. 398/79 |
| 6,512,612 B1 | * 1/2003 | Fatehi et al. | ................... 398/49 |
| 6,671,256 B1 | * 12/2003 | Xiong et al. | ................. 370/230 |

* cited by examiner

*Primary Examiner*—Jason Chan
*Assistant Examiner*—Christina Y. Leung
(74) *Attorney, Agent, or Firm*—Barnes & Thornburg

(57) ABSTRACT

In a WDM network, a plurality of the channels are grouped together to form a packet. The format of one of the channels within the packet includes a packet header for providing routing or forwarding information for data on all of the channels of the group. The packet is routed or forwarded by a single port of a switching device in the nodes. This reduces usage of the ports of the switching device, and the invention enables an increase in the data transfer rate without altering the line equipment, as the individual channels still carry data at the same rate.

9 Claims, 2 Drawing Sheets

PACKET-BASED OPTICAL COMMUNICATIONS NETWORKS

FIELD OF THE INVENTION

This invention relates to the field of optical communications networks, and in particular to packet-based optical networks, and to the frame structure and node architecture used in such networks.

BACKGROUND OF THE INVENTION

The rapid increase in transmission capacity achieved by optical transmission systems has required the solution to numerous technical difficulties. The data capacity within optical networks is determined by the limits of transmission rates per channel and the number of available optical frequencies. The transmission capacities far exceed the capability of electronic processing of signals. However, electronic and opto-electronic elements are required for performing switching and routing functions per channel, and the conversion of many high-speed optical data to electrical signals with analysis to enable the switching and routing operations to be carried out is recognised as causing a limitation to data transfer rates.

There have been proposals which provide all-optical networks in which switching and routing take place in the optical domain. An alternative proposal is to provide packet based communication with the packet header optically encoded at a lower data rate than the data rate of the packet payload. This enables opto-electric conversion circuitry to be employed which has a lower detection bandwidth that that which would be required to carry out opto-electric conversion of the packet payload. Thus, low cost electronics can be used to enable the header to be read for routing purposes, and high speed conversion is required only when the payload data is to be read, at the destination node for the particular signal. Other advantages of packet-based optical transmission systems are well known. Generally, such systems allow much greater use of available bandwidth than circuit switched systems.

As optical pulses become more closely spaced and the channels of a WDM (wavelength division multiplex) system become more closely spaced along the frequency spectrum, the need for accurate control of optical pulse timing and shape is paramount. As the data transfer rates have increased, so has the ability to compensate for such effects as chromatic dispersion, either using appropriate fiber designs (such as dispersion managed fiber) or compensating elements (such as additional lengths of high positive dispersion fiber or Bragg gratings). These dispersion compensation measures enable the spectral spreading of pulses to be controlled and aligned accurately, even across different channels.

An optical network typically comprises a number of spaced nodes, which allow signals to be added to or dropped from the network. The nodes also perform routing functions, and have switching arrangements for this purpose. These may be optically transparent (photonic cross connects) or else the switching may take place in the electrical domain. These switching arrangements allow the signal at any input to be switched to any output. The complexity and cost of such arrangements is a function of the number of inputs and outputs, together with the number of times the data signal is converted from and to the optical domain.

Optical amplifiers are spaced between the nodes, for example every 80 km, and these compensate for optical signal attenuation. Dispersion compensation may also take place at the amplifier locations. In conventional networks, regeneration takes place at the nodes, which involves conversion from the optical domain to the electrical domain, with subsequent modulation of a new optical carrier. Proposed all-optical networks avoid the need for such electrical regeneration, but amplification and dispersion compensation is still required. More accurate dispersion compensation is required for higher bit rate systems.

If existing network architecture is to be upgraded to enable transmission at higher bit rates, this will typically require an increased number of amplifiers with shorter separation between amplifiers, in order to tolerate the higher bit rates. This upgrade requires significant expenditure on both transmission network and switching node hardware.

SUMMARY OF THE INVENTION

According to a first aspect of the invention, there is provided a WDM optical communications network comprising a plurality of nodes, wherein data to be transmitted between nodes is provided on a plurality of different wavelength channels structured as data sub-packets, wherein a plurality of the channels are grouped together to form a packet and wherein the format of one of the channels within the packet includes a packet header for providing routing or forwarding information for data on all of the channels of the group, the nodes of the network each comprising an optical switching device which selectively routes or forwards data packets at the inputs to the switching device to outputs of the switching device, wherein the data packets of the wavelength group of channels are provided to a single port of the switching device and are thereby routed together to an output port of the switching device in dependence on the contents of the packet header.

This network architecture groups packet channels together, with the channels of the group sharing a packet header. They can thus be provided to a single port of the cross connect, reducing usage of the ports of the cross connect. The invention enables an increase in the data transfer rate without altering the line equipment, as the individual channels still carry data at the same rate. This means the existing per band or per channel dispersion compensation elements and amplifier separation can be maintained.

The plurality of channels may comprise four consecutive DWDM channels.

Preferably, the optical switching device comprises a photonic cross connect which routes the packets without opto-electric conversion of the packet data. However, each node further comprises packet header reading circuitry having opto-electric conversion circuitry for converting the packet header from the optical to the electrical domain.

According to a second aspect of the invention, there is provided a packet structure for packetized optical data for transmission over a WDM optical network, wherein data to be transmitted between nodes is provided on a plurality of different wavelength channels structured as a data sub-packets, wherein a packet includes data for a plurality of the wavelength channels grouped together and a packet header, wherein the packet header provides common routing or forwarding information for the data on all of the wavelength channels of the group.

This wavelength group packet structure enables the network architecture of the invention to be implemented. The bit rate of the data in the packet header may be lower than the bit rate of data in the remainder of the packet. This enables simplified electronic circuitry to be used for reading the packet header, without the need to convert the user data to the electrical domain. The bit rate of the user data in the frame is greater than or equal to 10 Gb/s whereas the bit rate of data in the packet header is less than or equal to 10 Gb/s.

According to a third aspect of the invention, there is provided a node for a node for a WDM optical communications network, wherein data to be transmitted between nodes of the network is provided on a plurality of different wavelength channels structured as data sub-packets, the node comprising:

a partial demultiplexer for partially demultiplexing the channels at an input to the node into a plurality of groups of wavelength channels, each group of channels sharing header information;

header reading circuitry for reading the header information associated with the groups of channels;

an optical switching device for selectively routing data packets at the inputs of the switching device to the outputs of the switching device, where each group of channels forms a data packet which is routed together in dependence upon the header information associated with the group of wavelength channels; and a multiplexer for multiplexing the switched groups of channels onto an output of the node.

The switching device may further comprise add and drop terminals to enable data to be introduced to the network or removed from the network at the node.

According to a fourth aspect of the invention, there is provided A method of transmitting data between a source node and a destination node, via an intermediate node, in a WDM optical communications network, the data being transmitted on a plurality of different wavelength group channels structured as data packets, the method comprising:

at the source node, providing a high data rate signal data on a group of lower data rate wavelength channels, providing a single packet header for the wavelength group of channels and allocating each channel to a WDM wavelength;

at the intermediate node, partially demultiplexing the channels to derive the group of wavelengths and routing the wavelength group of channels according to the data in the single packet header; and at the destination node, combining the data on the channels of the wavelength group to derive the high data rate user data.

BRIEF DESCRIPTION OF THE DRAWINGS

Examples of the present invention will now be described in detail with reference to the accompanying drawings in which.

DETAILED DESCRIPTION

Figure 1:
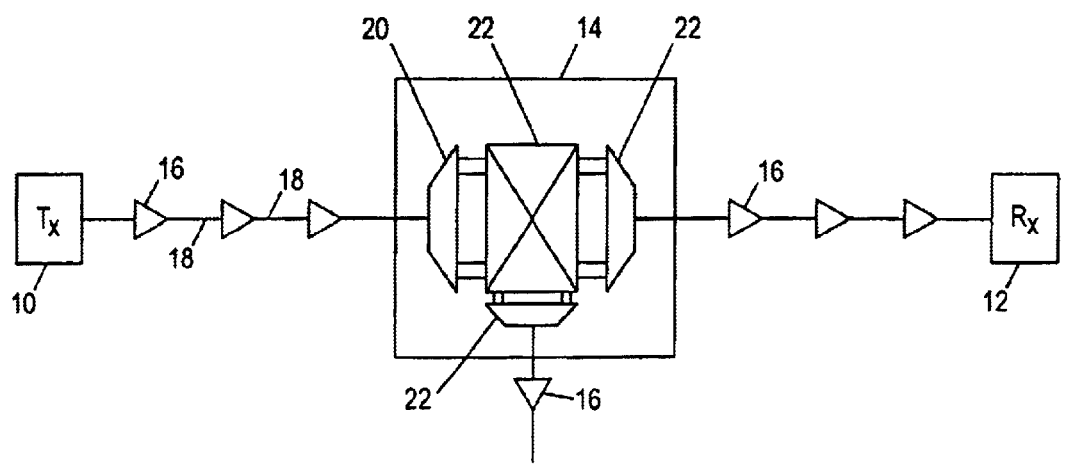
FIG. 1 shows schematically a known network architecture.

FIG. 1 shows schematically a known network architecture for a WDM communications network which can be operated in accordance with the invention. Data is provided to the network at a transmitter 10 and is received from the network at a receiver 12.

The network is constructed from a plurality of nodes 14, one of which is shown in FIG. 1. The transmitter 10 and receiver 12 are in fact also implemented as nodes, which add or drop signals to or from the network.

Data to be transmitted between nodes is provided on a plurality of different wavelength channels, multiplexed together. The channels may comprise DWDM channels. The invention concerns packet based networks, in which the data is packetized.

Optical amplifiers 16 are positioned between the nodes to compensate for fiber loss. Dispersion compensation may also be carried out at the amplification sites. For a system supporting 10 Gb/s channels, these amplifiers are typically spaced by approximately 80 km of communication fiber 18.

Conventionally, each node 14 comprises a demultiplexer 20 for demultiplexing the channels at an input to the node into the individual channels, which are then each supplied to a respective input port of a switching arrangement 22. The switching arrangement enables signals at the switching device ports to be routed to other ports, thereby implementing a routing function. For a packet-based network, the routing information is carried in optical headers of each channel, and the node comprises header reading circuitry for reading the header and thereby controlling the switching arrangement 22.

The outputs of the node are multiplexed together using multiplexer 23 for transmission over the communication fiber.

The network architecture has been described only briefly, as the details will all be well known to those skilled in the art. It will be appreciated that the switching arrangements can implement routing functions as well as protection switching functions, and that the nodes permit bidirectional communication between communicating nodes 10,12. For simplicity, unidirectional communication has been shown schematically in FIG. 1.

The invention concerns the transmission of data at a higher rate than the data rate supported by the individual channels. In particular, the invention aims to achieve this with minimum modification to the existing network hardware. The invention provides a packet structure which enables channels to be grouped together and routed as a single entity. A single packet 30 includes data $32_1$, $32_2$, $32_3$, $32_4$ for a plurality of the channels $\lambda_1$, $\lambda_2$, $\lambda_3$, $\lambda_4$ grouped together. A single packet header 34 is provided on one of the channels which includes common routing information for the data on all of the channels of the group. The header 34 also indicates the identity and order of the channels forming the packet in addition to the routing and forwarding information. The channels of the group are also provided with a guard band 33.

The bit rate of the data in the packet header 34 is lower than the bit rate of data in the remainder of the frame. For example, the frame data rate may be 10 Gb/s or 40 Gb/s, whereas the bit rate of data in the packet header is lower, for example between 1 Gb/s and 2.5 Gb/s. In a network in which the user data is switched transparently, the enables lower cost electronics to be used to read low data rate header, as this electronics is not required to read the high data rate payload data.

The channels within the group are preferably adjacent channels, in order to simplify the dispersion compensation.

Figure 2:
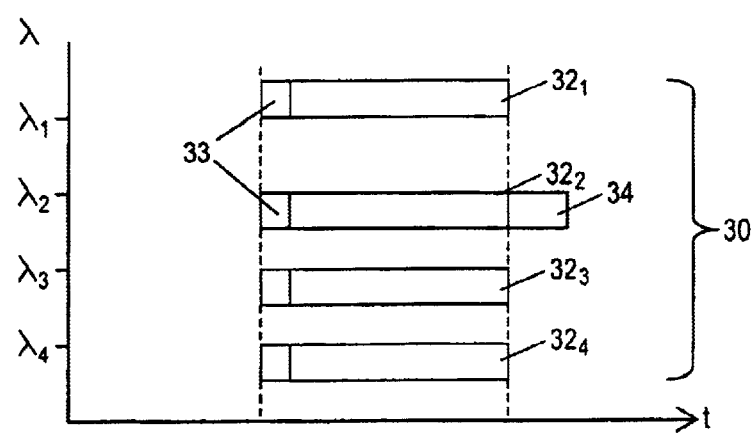
FIG. 2 shows a frame structure of the invention.
Figure 3:
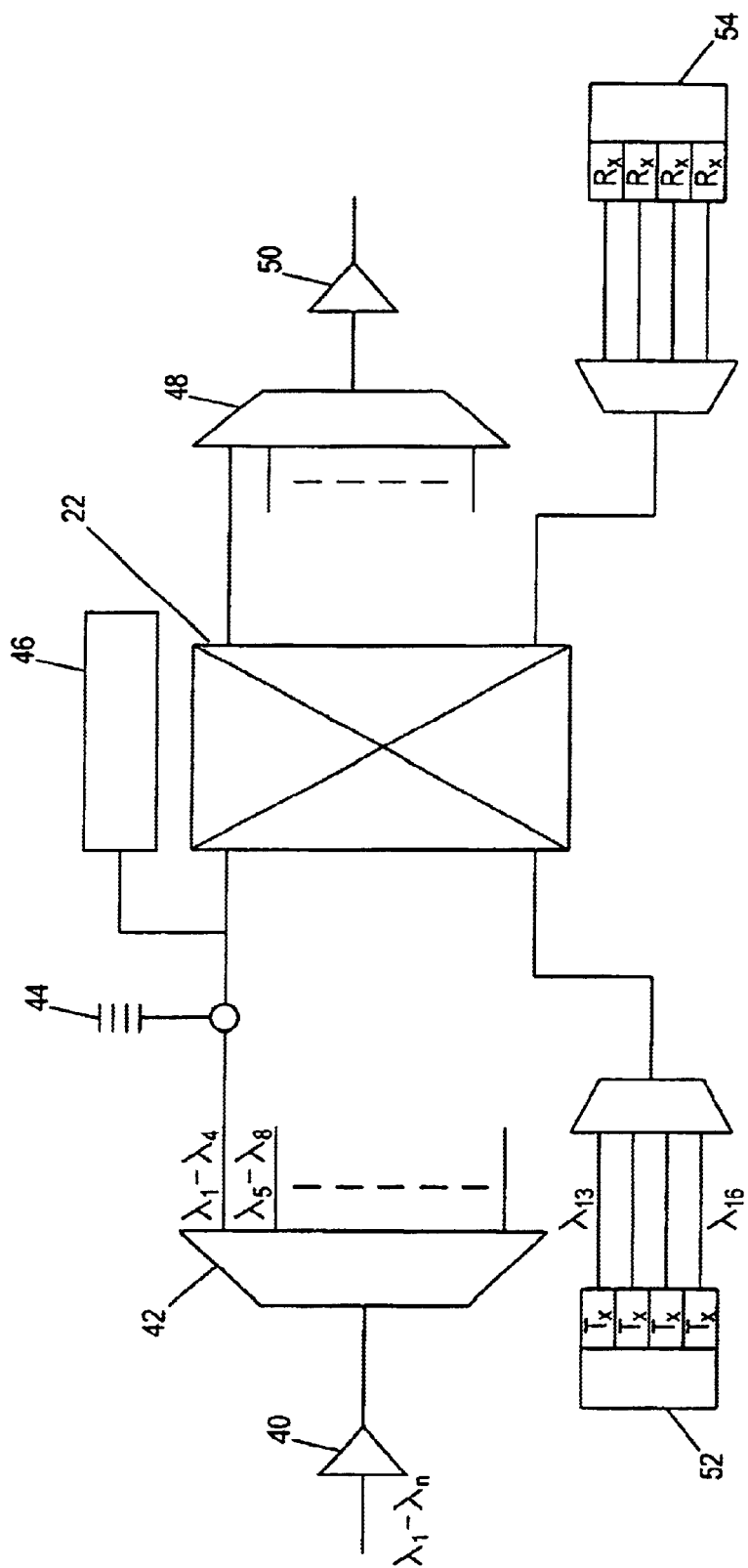
FIG. 3 shows in greater detail a node of the invention which can be used to implement a network architecture such as that of FIG. 1.

FIG. 3 shows in greater detail a node of the invention. The multiplexed channels are provided to a pre-amplifier 40 at the input of the node. A partial demultiplexer 42 partially demultiplexes the channels at the input to the node into predetermined wavelength groups of channels. Each group of channels has the frame structure of FIG. 2.

Dispersion compensation elements 44 are provided for each wavelength group of channels. These may comprise a circulator which routes the data to a Bragg grating to implement wavelength dependent delays. Header reading circuitry 46 is provided for reading the header information 34 associated with the wavelength group of channels, and this information is used to control the photonic cross connect 22 which routes the wavelength group of channels together. The photonic cross connect routes optical signals without opto-electric conversion, so that opto-electric conversion is required only for the header.

The wavelength groups of channels at the output of the cross connect 22 are provided to a multiplexer 48 which multiplexes the switched wavelength groups of channels onto an output of the node. This output is provided with a post-amplifier 50.

The wavelength channels of the group are provided to a single port of the cross connect 22, reducing usage of the ports of the cross connect. Since the bit rate of the individual channels remains unchanged, an increase in the efficiency of data transfer across the node can be achieved without altering the photonic switching equipment. This means the existing dispersion compensation elements at the amplifier sites are still appropriate even for the increased data transfer rate.

The node also has add and drop capability with an add terminal 52 and a drop terminal 54 to enable data to be introduced to the network or removed from the network at the node. Where signals are dropped, at the destination node, the data on the channels of the group are combined to reconstruct the high data rate user signals.

In the examples described above, a group of channels comprises four channels. There may instead be a different number of channels in each group. If there are four channels per group, 10 Gb/s line equipment can be used to transmit 40 Gb/s data, or 40 Gb/s line equipment can be used to transmit 160 Gb/s data, for example. The need to retain existing line equipment is particularly valuable for long haul networks.

All channels may be divided into groups, or else some channels may remain as individual channels which can be individually routed by the nodes. Thus, if low data rate transmission is required, the source node will place the data on a channel within a group bound for the same destination node. This ensures that the bandwidth of a group of channels is used efficiently. If high data rate transmission is required, the source node will allocate the data to a group of channels sharing the same port of the switching fabric of the nodes.

Various modifications will be apparent to those skilled in the art.

What is claimed is:

1. A WDM optical communications network comprising a plurality of nodes, wherein data to be transmitted between nodes is provided on a plurality of different wavelength channels structured as data sub-packets, wherein a plurality of the channels are grouped together to form a packet and wherein the format of one of the channels within the packet includes a packet header for providing routing or forwarding information for data on all of the channels of the group, the nodes of the network each comprising a partial demultiplexer for partially demultiplexing the channels at an input to the node into a plurality of said groups of wavelength channels and an optical switching device which selectively routes or forwards data packets at the inputs to the switching device to outputs of the switching device, wherein the data packets of the wavelength group of channels are provided to a single port of the switching device and are thereby routed together to an output port of the switching device in dependence on the contents of the packet header for the partially demultiplexed group of channels.

2. A network according to claim 1, wherein the packet header provides packet identity, order and routing or forwarding information.

3. A network according to claim 1, wherein the plurality of channels comprises four consecutive DWDM channels.

4. A network according to claim 1, wherein the optical switching device comprises a photonic cross connect which routes the packets without opto-electric conversion of the packet data.

5. A network according to claim 1, wherein each node further comprises packet header reading circuitry.

6. A network according to claim 5, wherein the packet header reading circuitry comprises opto-electric conversion circuitry for converting the packet header from the optical to the electrical domain.

7. A node for a WDM optical communications network, wherein data to be transmitted between nodes of the network is provided on a plurality of different wavelength channels structured as data sub-packets, the node comprising:

a partial demultiplexer for partially demultiplexing the channels at an input to the node into a plurality of groups of wavelength channels, each group of channels sharing header information;

header reading circuitry for reading the header information associated with the groups of channels;

an optical switching device for selectively routing data packets at the inputs of the switching device to the outputs of the switching device, where each group of channels forms a data packet which is routed together in dependence upon the header information associated with the group of wavelength channels; and a multiplexer for multiplexing the switched groups of channels onto an output of the node.

8. A node according to claim 7, wherein the switching device further comprises add and drop terminals to enable data packets to be introduced to the network or removed from the network at the node.

9. A method of transmitting data between a source node and a destination node, via an intermediate node, in a WDM optical communications network, the data being transmitted on a plurality of different wavelength group channels structured as data packets, the method comprising:

at the source node, providing a high data rate signal data on a group of lower data rate wavelength channels, providing a single packet header for the wavelength group of channels and allocating each channel to a WDM wavelength;

at the intermediate node, partially demultiplexing the channels to derive the group of wavelengths and routing the wavelength group of channels according to the data in the single packet header; and at the destination node, combining the data on the channels of the wavelength group to derive the high data rate user data.

* * * * *